United States Patent [19]

Costella

[11] Patent Number: 4,696,544
[45] Date of Patent: Sep. 29, 1987

[54] FIBERSCOPIC DEVICE FOR INSPECTION OF INTERNAL SECTIONS OF CONSTRUCTION, AND METHOD FOR USING SAME

[75] Inventor: James G. Costella, Suffolk County, N.Y.

[73] Assignee: Olympus Corporation, Lake Success, N.Y.

[21] Appl. No.: 799,005

[22] Filed: Nov. 18, 1985

[51] Int. Cl.⁴ .......... G02B 23/26; A61B 1/00; G01N 21/16; B25J 1/00
[52] U.S. Cl. .............. 350/96.26; 350/96.25; 350/320; 128/4; 128/6; 356/241; 414/1
[58] Field of Search ............ 350/96.10, 96.24, 96.25, 350/96.26, 96.27, 96.28, 320; 128/4, 6, 7, 8, 9; 356/241; 414/1, 2, 3, 4, 5, 6, 7; 165/11.1, 11.2; 901/19, 20, 23, 24, 25, 26, 27, 28, 29, 30, 41, 44, 46, 47

[56] References Cited

U.S. PATENT DOCUMENTS

| | | | |
|---|---|---|---|
| 1,969,342 | 8/1934 | Wappler et al. | 128/6 |
| 3,270,641 | 9/1966 | Gosselin | 350/96.26 |
| 3,294,085 | 12/1966 | Wallace | 350/96.26 X |
| 3,572,325 | 3/1971 | Bazell et al. | 128/6 |
| 3,610,231 | 10/1971 | Takahashi et al. | 128/6 |
| 3,690,775 | 9/1972 | Cousins | 356/241 |
| 3,694,094 | 9/1972 | Low et al. | 356/241 |
| 3,773,034 | 11/1973 | Burns et al. | 128/4 |
| 3,778,170 | 12/1973 | Howell et al. | 356/241 |
| 4,020,829 | 5/1977 | Willson et al. | 128/2 M |
| 4,033,331 | 7/1977 | Guss et al. | 128/2 M |
| 4,066,071 | 1/1978 | Nagel | 128/7 |
| 4,085,743 | 4/1978 | Yoon | 128/6 |
| 4,175,545 | 11/1979 | Termanini | 128/6 X |
| 4,207,873 | 6/1980 | Kruy | 128/6 |
| 4,231,419 | 11/1980 | Gugel | 165/11 A |
| 4,277,168 | 7/1981 | Oku | 128/4 X |
| 4,298,312 | 11/1981 | Mackenzie et al. | 350/96.26 X |
| 4,329,980 | 5/1982 | Terada | 128/4 |
| 4,412,177 | 10/1983 | Petrini et al. | 350/96.26 X |
| 4,430,996 | 2/1984 | Bonnet | 128/4 X |
| 4,452,236 | 6/1984 | Utsugi | 128/4 |
| 4,483,326 | 11/1984 | Yamaka et al. | 128/4 |
| 4,530,568 | 7/1985 | Haduch et al. | 350/96.26 X |
| 4,534,339 | 8/1985 | Collins et al. | 128/6 |
| 4,575,185 | 3/1986 | Wentzell et al. | 350/96.26 |

FOREIGN PATENT DOCUMENTS

| | | | |
|---|---|---|---|
| 2937350 | 7/1980 | Fed. Rep. of Germany | 128/4 |
| 3007994 | 9/1980 | Fed. Rep. of Germany | 128/4 |
| 1559185 | 1/1980 | United Kingdom | 356/241 |
| 2154335A | 9/1985 | United Kingdom | 350/96.26 |

OTHER PUBLICATIONS

Veinberg et al., "Mechanisms for Controlling a Flexible Endoscope", Sov. J. of Opt. Tech., vol. 48, No. 1, 1/81 pp. 36-37.

Primary Examiner—William L. Sikes
Assistant Examiner—Brian M. Healy
Attorney, Agent, or Firm—Kenyon & Kenyon

[57] ABSTRACT

An apparatus and method for using the same to inspect the interior of a construction such as a vessel, piping, machinery and the like, including jet engine combustion cans, comprises a fiberscope having a probe carrying fiberoptic systems which is inserted into the construction interior through an articulable and rotatable guide insertion tube. The guide insertion tube is articulated and/or rotated to manipulate the fiberscope probe and aim it toward a passage into an adjacent interior section. Once the fiberscope probe is extended out of the guide insertion tube and into the next interior section, it acts as a lead wire over which the guide insertion tube in pushed to extend the guide insertion tube into the next section, and so forth for the desired number of interior sections.

21 Claims, 9 Drawing Figures

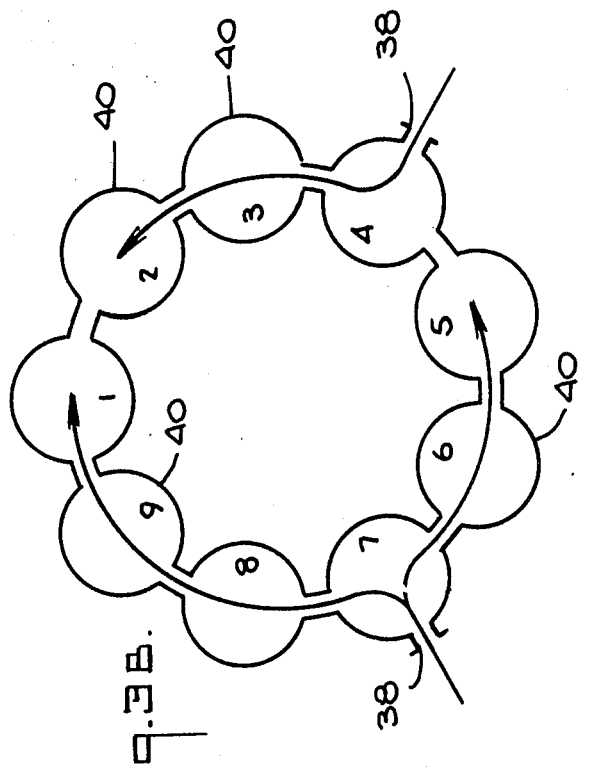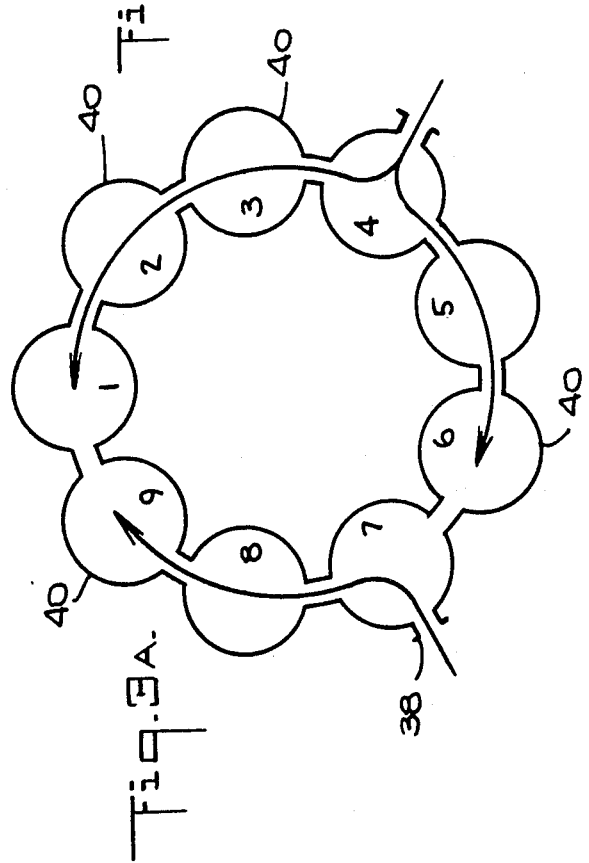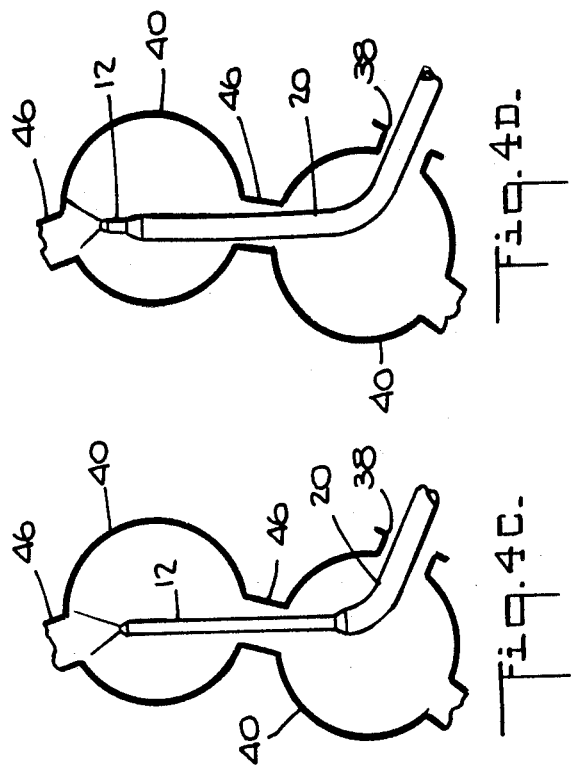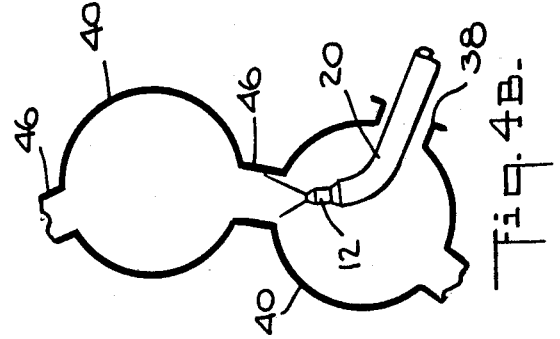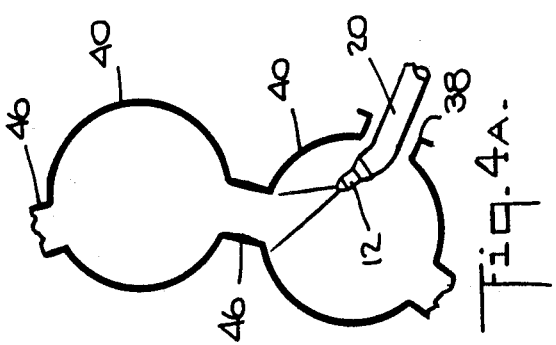

FIBERSCOPIC DEVICE FOR INSPECTION OF INTERNAL SECTIONS OF CONSTRUCTION, AND METHOD FOR USING SAME

BACKGROUND OF THE INVENTION

The present invention relates to a fiberscopic device for the inspection of the interior sections of a construction, such as a machine, vessel, piping and the like, and to a method for using the same, and in particular, has application to the inspection of the hot sections, such as the combustion chambers or cans, of jet engines.

While the present invention is described hereinbelow in the context of one inspection procedure for a particular model of jet engine, it will be appreciated by those skilled in the art that this description is illustrative only, and that the invention disclosed herein is neither limited to such types of inspections nor only to inspections of jet engines; rather, the teachings disclosed herein have many applications. Further, while for ease of description the device is described as being useful for inspecting machine interiors, it should be understood that it is not so limited, and may be used to inspect many types of constructions or devices not admitting of easy visual inspection.

It has long been desirable to inspect the interior sections of constructions, such as vessels, piping or certain types of machinery, including jet engines, to examine for defects such as coking, cracking, wear, burning, etc. To avoid the need to disassemble the engine, which itself suffers from several drawbacks, various other methods have been proposed to inspect the engine interior while the engine is assembled, or even still mounted on the wing of an aircraft. In one known method, the engine is wrapped with a radiation-sensitive film, and a radioactive source is inserted into the engine to expose the film from within the engine. While this method is usually adequate to locate gross defects in the engine's condition, it is not sufficiently sensitive to reveal, for example, cracks or burn spots which while they appear minor at the time of inspection, perhaps due to the insensitivity of this method, might perhaps warrant maintenance at that time, or even worse, lead to more serious defects if left untreated. Further, even when this method is able, for example, to locate a crack, because of its imprecision it is typically incapable of discerning the length of the crack.

Accordingly, fiberscopic devices, which also have known medical applications, have been used to inspect the interior of jet engines, either or alone or as an adjunct to a radiation-sensitive film technique. Examples of known fiberscope devices are disclosed in U.S. Pat. Nos. 3,583,393 and 3,788,304 assigned to Olympus Optical Co., Ltd. of Tokyo, Japan, which are herein incorporated by reference. Typically, a fiberscopic device includes an elongated tube, or probe, with light transmitting and fiber optical systems along its length to illuminate an interior section to be inspected and transmit an image back to an eyepiece through which the operator can view the image.

A disadvantage of the known fiberscopic designs when used to inspect a machine has been the inability to control the movement of the fiberscope probe within the interior of the machine to enable a more thorough inspection, for example, into adjacent interior sections of the machine which are not themselves accessible from the exterior of the machine. For example, in the inspection of a particular aircraft jet engine, the model JT8D manufactured by Pratt & Whitney Aircraft, a division of United Technologies, the known fiberscopic devices are useful in inspecting the two combustion chambers, or cans, (#4 and #7) which are accessible from the exterior of the engine via the ignitor ports of the engine. Only with a great deal of operator manipulation, if at all, is it possible to extend the fiberscope probe through a crossover tube connecting either the #4 or #7 can with an adjacent can. (It will be appreciated that a JT8D engine comprises nine combustion cans). Thus, the condition of the two cans, i.e., the #4 and #7 cans, which are capable of visual inspection with the known fiberscopic devices has been used in conjunction with other inspection techniques to predict the condition of the cans which cannot be reached with the fiberscope probe for a visual inspection. Obviously, a device capable of permitting a thorough visual inspection of all of the combustion cans of this or any other engine, and for that matter, other interior sections of other constructions or machines which are not readily accessible from the exterior, would be highly desirable.

Accordingly, it is among the objects of the present invention to provide an improved fiberscopic inspection device which enables an operator to control and manipulate the fiberscope probe accurately while extended into the interior of a construction. It is another of the objects of the invention to enable the inspection of adjacent interior sections, including those to which access cannot readily be had from the exterior of the construction.

SUMMARY OF THE INVENTION

These and other objects of the present invention, which will be readily apparent to those skilled in the art, are accomplished by an inspection device including a fiberscope having a probe, of a type which is itself known in the art, and a hollow guide insertion tube and guide control body for manipulating the fiberscope probe while the latter is in the interior of the machine being inspected. The fiberscope includes an elongated tube or probe extending therefrom which in a preferred embodiment has a distal end portion which is articulatable at least in two direction in the same plane. It will be understood by those skilled in the art that the fiberscope probe may be of the non-articulating variety, or may articulate in four directions in two perpendicular planes, depending on the needs of the particular application. The fiberscope is connected with a light source, and its probe carries a fiberoptic system to illuminate an object to be viewed through a lens means located at the end of the probe and to transmit the observed image to an eyepiece to be viewed by an operator. The fiberscope is inserted into a fiberscope holder which in the preferred embodiments comprises two parts rotatable relative to each other to permit the rotation of the probe around its longitudinal axis.

The fiberscope probe is guided into and through the interior sections of the machine to be inspected through the hollow guide insertion tube which extends from the guide control body. The guide control body also may comprise two parts rotatable relative to each other, whereby the guide insertion tube is rotatable around its longitudinal axis. In accordance with the present invention, the guide insertion tube includes at least a distal end portion which, in a manner similar to the fiberscope probe, is articulatable in at least two directions in the same plane. Again, depending on the needs of the application, the guide insertion tube may be articulatable in four direction in two planes perpendicular to each other.

Preferably, the guide control body is mounted to the construction to be inspected, which advantageously frees both of the operator's hands for easier and more effective manipulation of the guide insertion tube and the fiberscope probe. For example, a commercially available plate and screw bolt assembly such as that used to mount a camera on a tripod is satisfactory. The plate can be coupled to an articulable support arm which in turn has a clamp at its other end for clamping the device to the machine to be inspected. (In the case of a jet engine, the clamp should be fastened to a secure part of the engine, and not to thin-walled or highly finished structures).

To perform an inspection of, for example, the interiors of the combustion cans of a Pratt & Whitney model JT8D jet engine, the ignitor plugs are removed from the ignitor ports located in the #4 and #7 combustion cans of the engine. The guide insertion tube and probe are inserted through the ignitor ports, and both are moved into all nine of the combustion cans as described below.

To prevent the accidental withdrawal of the guide insertion tube, for example, due to gravity when it is being directed upwardly, a friction plate or other suitable retaining means which can be affixed to the exterior of the machine being inspected, may be used. A bore in the retaining means, preferably lined with a O-ring, is aligned over the opening in the machine through which the guide insertion tube and probe are inserted. Because the bore has a diameter only slightly larger than the outer diameter of the guide insertion tube, it aids in preventing the guide insertion tube from falling out of the opening in the machine, which may have a substantially larger diameter, and is also useful when the operator wishes to insert the guide insertion tube in small increments.

The specific inspection operation of the JT8D jet engine, which is herein described for illustrative purposes only, is performed as follows: After the friction plate is mounted to the ignitor plug boss, the guide control body is attached to the articulating support arm and its clamp is attached to a suitable engine component. The fiberscope body is then locked into the fiberscope holder and the fiberscope probe is inserted through a bore in the guide control body along the length of the guide insertion tube until the articulating end portion of the fiberscope probe emerges from the end of the guide insertion tube. A mark or other indicia may be applied to the fiberscope to indicate when the probe is inserted to this point, as for example, when the mark meets the guide control body.

With the guide insertion tube and fiberscope probe articulation levers in the neutral position (i.e., so that the articulatable end portion of both the guide insertion tube and the probe are non-articulated), the guide insertion tube and fiberscope probe are inserted through the friction plate bore into either combustion can #4 or #7. While viewing the liner of the can opposite the ignitor port, the guide insertion tube is articulated, rotated or otherwise displaced within the can as necessary to locate the crossover tube leading to an adjacent combustion can. While keeping the crossover tube in the center of the view field, the guide insertion tube and probe are pushed farther into the can to move them closer to the crossover tube.

By then pushing the fiberscope holder and fiberscope toward the guide control body, which preferably are connected, for example, by an articulating arm, the fiberscope probe is further extended outwardly of the end of the guide insertion tube and through the crossover tube into the adjacent can. A second mark or other indicia may be applied to the probe to indicate when a predetermined length of the probe has been extended, e.g., when the second mark meets the guide control body.

The guide insertion tube articulating control lever should then be returned to the neutral position and the guide insertion tube pushed farther into the engine so that it follows along the fiberscope probe, which acts as a lead wire into the adjacent can. Preferably, while the guide insertion tube is being pushed farther into the engine, the probe is being gradually withdrawn (by moving the fiberscope holder away from the guide control body), until the first mark again meets the guide control body, thus indicating that only the articulating end of the fiberscope probe protrudes from the end of the guide insertion tube.

Once the fiberscope probe is inserted into the last combustion can accessible along the particular route chosen for insertion into the engine, the probe and guide insertion tubes are articulated, rotated and otherwise displaced, with respect to each other and the can, as necessary to inspect thoroughly the interior of that can. Each of the cans is then inspected as the scope is withdrawn. The foregoing steps are then repeated to snake the fiberscope probe through the remaining cans accessible from the particular ignitor port through which the device has been inserted and all of those cans are inspected as the device is withdrawn. The device is then inserted through the other ignitor port and the procedure is repeated, thereby enabling the inspection of every combustion can of the engine.

BRIEF DESCRIPTION OF THE DRAWINGS

For a better understanding of the present invention, the scope of which will be pointed out in the appended claims, reference is made to the following detailed description of an exemplary embodiment thereof, taken in conjunction with the accompanying drawings, in which:

FIGS. 3(a) and 3(b) are simplified schematic illustrations indicating the alternative routes which may be taken within a particular jet engine to inspect all of the combustion cans thereof;

FIGS. 4(a) through 4(d) schematically illustrate the sequential steps of moving the guide insertion tube and fiberscope probe from one combustion can to an adjacent combustion can; and FIG. 5 is a plan view of a retaining means, and in this case a friction plate particularly adapted to be mounted to the ignitor port of the Pratt & Whitney JT8D jet engine through which the guide insertion tube and probe are inserted.

DESCRIPTION OF EXEMPLARY EMBODIMENT

Figure 1:
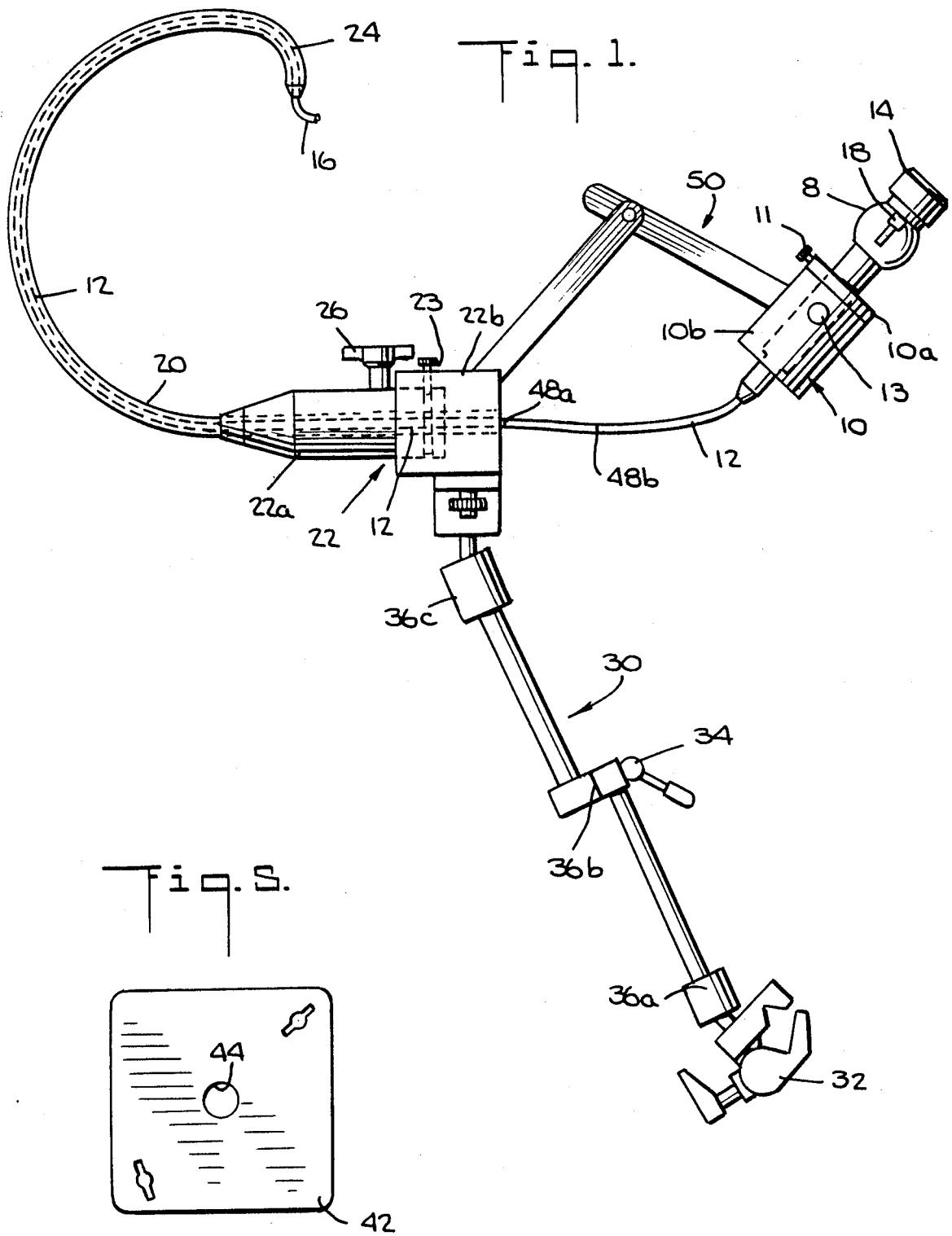
FIG. 1 is a side view of a preferred embodiment of the fiberscope and guide assembly in accordance with of the present invention.
Figure 2:
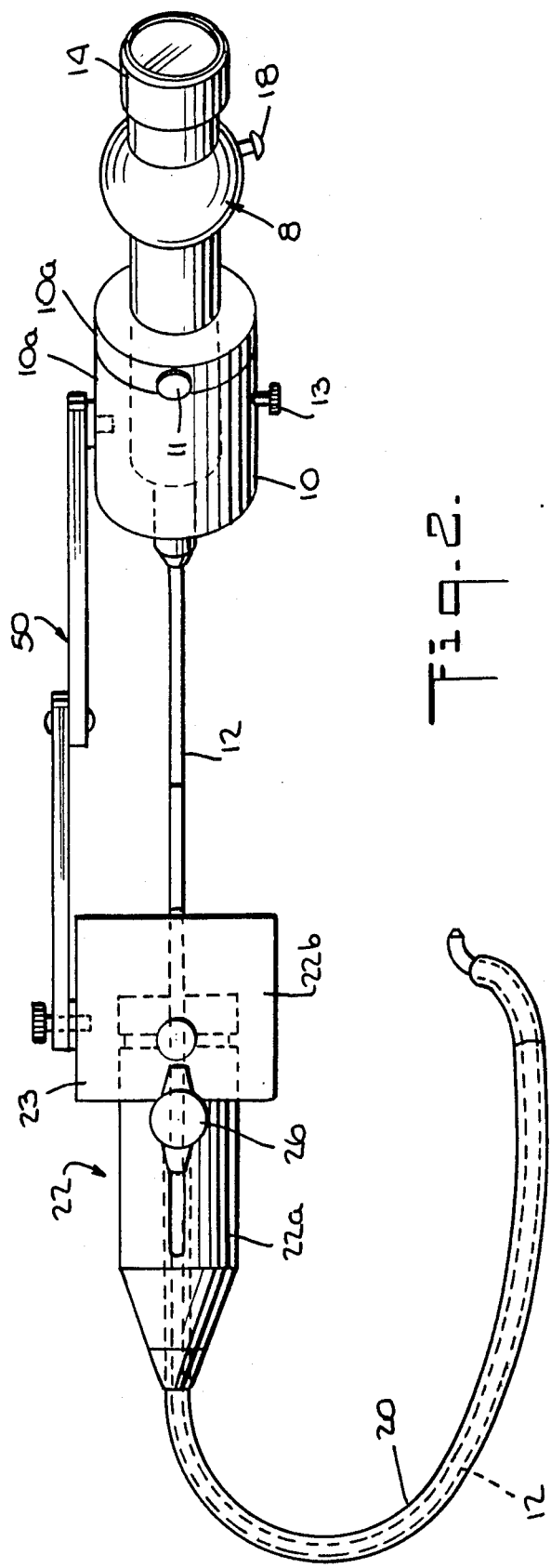
FIG. 2 is a top view of the fiberscope and guide tube assembly illustrated in FIG. 1.

With reference to FIGS. 1 and 2, there is illustrated an inspection device constructed in accordance with the principles of the present invention. The device includes a fiberscope 8 of a type which is itself known in the art. One such fiberscope particularly suited to the present invention, although others are contemplated, is the model IF6D3-20 Flexible Fiberscope manufactured by Olympus Optical Co., Ltd., of Tokyo, Japan. The fiberscope 8 is connected with a light source (not shown) and includes an elongated tube or probe 12 extending therefrom, and an eyepiece housing 14 through which an operator may view images observed by the fiberscope 8. In accordance with the exemplary embodiment, the fiberscope probe 12 includes a distal end portion 16 which is articulatable in a known manner in at least two direction in the same plane. Examples of such articulating fiberscopes are disclosed in the aforementioned incorporated patents. Typically, wires or cables extend from the fiberscope body 8 along the length of the probe 12 to a fixed location near the end of the probe, and are manipulated by a knob or lever 18 on the fiberscope body 8. The fiberscope could also be articulatable in four directions in two planes, depending upon the desired application. It will be understood also that the fiberscope need not be one including articulating means, and that a non-articulating fiberscope may be used in conjunction with the guide control body of the present invention to great advantages). The probe 12 carries a fiberoptic system to illuminate an object to be viewed through a lens means located at the distal end 16 of the probe and to transmit the observed images to the eyepiece 14 to be for viewed by an operator, again in a manner known to those skilled in the art.

The fiberscope 8 is held in a fiberscope holder 10. In the exemplary embodiment the holder 10 comprises two cylindrical parts 10a and 10b, part 10a being mounted for rotation within part 10b. The fiberscope body 8 is held securely in the fiberscope holder part 10a by a set screw 11, and the two cylinders are locked in a desired position relative to each other by a locking screw 13. When it is desired or necessary to rotate the probe 12 during the insertion or inspection procedures, described more fully below, the locking screw 13 is released and the fiberscope body 8 and the holder part 10a are rotated in the holder part 10b into a desired position, then relocked in place by tightening the locking screw 13. Thus, an operator is able to rotate the probe 12 around its longitudinal axis.

In accordance with the present invention, the fiberscope probe 12 is guided into and through the interior sections of the machine to be inspected by a hollow guide insertion tube 20 which extends from a guide tube body 22. In accordance with the present invention, the guide insertion tube 20 includes at least a distal and portion 24 which is articulatable, via a lever 26 on the guide control body 22, in at least two direction in the same plane. The articulating means of the guide control body 22 and insertion tube 20 are similar to the known articulating means of the fiberscope probe 12. If desired or necessary, the guide insertion tube 20 may be articulatable in four direction in two perpendicular planes.

The guide control body 22, comprises two parts 22a and 22b which are coupled to each other in a suitable manner so as to permit rotation of the parts 22a and 22b relative to each other. For example, the guide control body part 22a may comprise a cylindrical portion extending into a cylindrical bore in the guide control body part 22b, the latter having screws or pins riding in a circumferential groove provided on the outer surface of the cylindrical portion of the guide control body part 22a. A locking screw 23 on the guide control body part 22b functions as the locking screw 13 on the fiberscope holder part 10b to fix the two guide control body parts 22a and 22b in a desired position. Thus, just like the fiberscope probe 12, the guide insertion tube 20 also is rotatable about its longitudinal axis by rotation of the guide control body part 22a from which it extends.

Preferably, the inspection device is mounted to the machine to be inspected. For example, a commercially available arrangement such as a plate and screw bolt assembly 28 used to mount a camera on a tripod (an example of which is manufactured by Manfrotto, S.A. of Italy and distributed in the U.S. by Bogen Photo Corp. of New Jersey), is satisfactory. The guide control body part 22b is provided with a ¼"×20 thread screw hole, standard for such camera mounts, to permit it to be fastened to the support plate. Preferably, the mounting means further includes an articulating arm 30, (an example of which is "The Magic Arm", which also is manufactured by Manfrotto, S.A.), which includes a clamp 32 at one end and a lever 34 which serves to lock all three joints 36(a), (b) and (c) when the arm is moved to the desired position. (When inspecting, for example, an aircraft jet engine, the clamp 32 should be fastened to a secure part of the engine, and not to thin-walled or highly finished structures). The use of the articulating support arm 30 or other suitable mounting assembly advantageously frees both of the operator's hands for easier and more effective manipulation of the guide insertion tube 20 and probe 12, as will be described more fully below.

Referring to FIGS. 3(a) and 3(b), to perform an inspection of the combustion cans 40 of a Pratt & Whitney model JT8D jet engine, the description of which herein is only for purposes of illustration, the ignitor plugs (not illustrated) are removed from the ignitor ports 38 located in the #4 and #7 combustion cans of the engine. To prevent the accidental withdrawal of the guide insertion tube, for example, due to gravity when it is being directed upwardly, a friction plate 42 (FIG. 5) can be affixed to the exterior of the engine. The plate 42 has a bore 44 therein aligned over the ignitor port, which is lined with an O-ring, and has a diameter slightly larger than the outer diameter of the guide insertion tube 20. The plate 42 is mounted to the ignitor plug boss by inserting expanding push pins, which are located in holes in the plate that are complementary to holes in the ignitor port boss 38. While the friction plate 42 illustrated herein has particular application to the ignitor ports of the JT8D engine, it will be appreciated that other plates suitably configured may be used in other applications to achieve the desired result of retaining the guide insertion tube 20 within the machine being inspected.

After the friction plate 20 is mounted to the ignitor plug boss, the guide control body 22 is attached to the articulatable support arm 30 and the clamp 32 of the support arm 30 is attached to a suitable engine component, the fiberscope probe 12 is inserted through a bore in the guide tube body 22 and along the guide insertion tube 20 until the articulating end portion 16 of the fiberscope probe 12 emerges from the end of the guide insertion tube 20. It will be appreciated that the probe 12 is movable longitudinally within the guide insertion tube 20. A mark 48(a) or other indicia may be applied to the fiberscope probe 12 to indicate when the probe 12 is inserted to this point, as, for example, when the mark 48(a) meets the guide control body 22 as illustrated in FIG. 1.

With the articulation levers 26 and 18, respectively, of the guide insertion tube 22 and fiberscope probe 12 in the neutral position (i.e., so that both articulatable end portions 24 and 16, respectively, of the guide insertion tube 20 and probe 12 are non-articulated), the guide insertion tube 20 and fiberscope probe 12 are inserted through the friction plate bore 44 covering the ignitor port 38 and into one of either combustion can #4 or #7. While viewing the liner of the can opposite the ignitor port 38, the guide insertion tube 20 is articulated, rotated and otherwise displaced within the can as necessary to locate the crossover tube 46 leading to an adjacent combustion can, as illustrated in FIG. 4(a). While keeping the crossover tube 46 in the center of the view field, the guide insertion tube 20 and probe 12 are inserted farther into the can 40 to move closer to the crossover tube 46, as illustrated in FIG. 4(b). The fiberscope holder part 10b and the guide control body part 22b are preferably connected, for example by an articulating arm 50, to permit relative movement between the guide control body 22 on the one hand, and the fiberscope holder 10 and fiberscope 8 on the other hand. By pushing the fiberscope holder 10 toward the guide tube body 22, the fiberscope probe 12 is pushed through the guide insertion tube 20 and extended outwardly of the end of the guide insertion tube 20 and through the crossover tube 46 into the adjacent can 40, as illustrated in FIG. 4(c). A second mark 48(b) or other indicia may be applied to the probe 12 to indicate when a predetermined length of the probe 12 beyond its articulatable end portion 16 e.g., sufficient to reach into about the middle of the can, has been extended from the guide insertion tube 20, as, for example, when the mark 48(b) meets the guide control body 22.

The articulating control lever 26 of the guide insertion tube 20 should then be returned to the neutral position and the guide insertion tube 20 pushed farther into the engine so that it follows along the fiberscope probe 12, which acts as a lead wire, and into the adjacent can 40, as illustrated in FIG. 4(d). Preferably, while the guide insertion tube 20 is being pushed farther into the engine (as in step 4(d)), the probe 12 is gradually being withdrawn, by pulling the fiberscope holder 10 away from the guide control body 22, until the first mark 48(a) again meets the guide control body 22 (thus indicating that only the articulating end portion 16 of the fiberscope probe 12 is protruding from the end of the guide insertion tube 20).

The foregoing steps are thus repeated to snake the fiberscope probe 12 through the adjacent cans 40 accessible through the particular ignitor port first entered, along routes such as those illustrated schematically in FIGS. 3(a) or 3(b). For example, with reference to FIG. 3(a), if the guide insertion tube 20 and fiberscope probe 12 are first inserted into the right ignitor port 38 (as seen in the drawing), the procedure is followed to guide the probe 12 into can #4 and along one of the routes to can #6 or #1. Performing the insertion step first allows the operator to take advantage of the relative alignment of the crossover tubes 46. Also, by first inserting the guide insertion tube and probe fully, before beginning to inspect, and then performing the inspection from the remote cans back toward the ignitor port, the operator can give his full attention to the inspection. Thus, the farthest can, e.g., #1, is inspected, the probe is withdrawn to can #2, which is then inspected, etc. to can #4; the probe is then reinserted through can #5 and into can #6, which is then inspected, the probe is then withdrawn to can #5 for inspection, and then out of can #4. The guide insertion tube 20 and probe 12 are then inserted through the other ignitor port (the left port 38 as seen in the drawing) and the procedure followed as before, thereby enabling the inspection of combustion cans #9, #8 and finally #7. Thus, it can be seen that with the present invention, an operator is able to inspect every combustion can of the engine.

While the present invention has been described with reference to an exemplary embodiment thereof, and with reference to one particular inspection procedure of a particular engine, it will be appreciated by those skilled in the art that variations and modifications may be made thereto without departing from the spirit of the inventive concepts disclosed herein. For example, even without modifications to the structure of the device, it will be appreciated that the increased ability to control the movement of a fiberscope within a construction or machine achieved by the guide control body and guide insertion tube of the present invention can increase the effectiveness of many other types of inspection of many other types of construction such as storage or manufacturing vessels, piping, etc., and not necessarily only to situations requiring the maneuvering of the probe into interior adjacent sections. Further, increasing or decreasing the lengths of the guide insertion tube and probe, or using articulating means capable of moving one or both of the probe and guide insertion tube in four directions also would lend the device to many different applications. All such variations and modifications are intended to fall within the scope of the appended claims.

I claim:

1. A device for inspecting interior sections of a construction, said device comprising the combination of
   a guide control body having a bore therethrough, a hollow, flexible guide insertion tube extending from said guide control body, and means to articulate at least a distal end portion of said flexible guide insertion tube remote from said guide control body;
   a fiberscope including a body, an elongated probe, and means for illuminating and transmitting images of at least a portion of said interior, wherein said fiberscope probe is inserted through said guide control body and said hollow guide insertion tube; and
   means to move said fiberscope body selectively toward and away from said guide control body to displace said fiberscope probe relative to said guide control body and said hollow guide insertion tube, whereby said means to articulate said hollow, flexible guide insertion tube and said means to move said fiberscope body are used selectively from the exterior of said construction to aim and control said fiberscope probe within said construction.

2. The inspection device according to claim 1, further comprising a mounting means for mounting said inspection device in a desired substantially stationary position relative to said construction.

3. The inspection device according to claim 2, wherein said mounting means comprises a support arm.

4. The inspection device according to claim 3, wherein said support arm comprises connecting means at one end for detachably fastening said support arm to said guide control body.

5. The inspection device according to claim 4, wherein said support arm further comprises a clamp means at an other end.

6. The inspection device according to any of claims 3, 4 or 5, wherein said support arm includes means for articulating said support arm.

7. The inspection device according to claim 1, wherein said fiberscope comprises means for articulating at least a distal end portion of said probe.

8. The inspection device according to claim 7, wherein said means for articulating said fiberscope probe permit controlled articulation of said at least distal end portion in at least two directions in one plane.

9. The inspection device according to claim 1, wherein said means for articulating said guide insertion tube permit controlled articulation of said at least distal end portion in at least two directions in one plane.

10. The inspection device according to claim 1, further comprising a fiberscope holder accomodating said fiberscope and including a first part and a second part, and wherein said probe is retained in said first part which is adapted to rotate relative to said second part.

11. The inspection device according to claim 1, wherein said guide control body includes means to rotate said guide insertion tube around a longitudinal axis thereof, said means to rotate comprising a first guide control body part and a second guide control body part adapted to rotate relative to each other.

12. The inspection device according to claim 10, further comprising connection means for connecting said fiberscope holder and said guide control body.

13. The inspection device according to claim 12, wherein said connection means includes an articulating arm.

14. The inspection device according to claim 1, further including retaining means having a bore therethrough for mounting on said construction, said bore being aligned over an opening in said construction through which said insertion tube and said probe are inserted into said construction.

15. The inspection device according to claim 14, wherein said retaining means comprises a friction plate including means for mounting said friction plate to said construction.

16. The inspection device according to claim 1, wherein said fiberscope probe has a first mark thereon indicating when said fiberscope probe is inserted in said guide insertion tube to a point at which a first portion of said fiberscope probe extends out of said guide insertion tube.

17. The inspection device according to claim 16, wherein said fiberscope probe has a second mark thereon indicating when a predetermined second portion of said fiberscope probe longer than said first portion extends out of said guide insertion tube.

18. A method for inspecting interior sections of a construction, said method comprising the steps of
  (i) inserting a hollow, flexible guide insertion tube into a first interior section of said construction to be inspected,
  (ii) viewing the interior of said first section via a fiberscope probe reaching into said first section through said hollow guide insertion tube,
  (iii) locating a channel means connecting said first interior section to an adjacent interior section by manipulating at least one of said guide insertion tube and said fiberscope probe,
  (iv) displacing said fiberscope probe relative to said hollow guide insertion tube to extend said fiberscope probe therefrom and through said channel means into said adjacent interior section,
  (v) pushing said flexible guide insertion tube along the extended length of said fiberscope probe so that said guide insertion tube also extends through said channel means into said adjacent interior section,
  (vi) repeating the foregoing steps (ii) through (v) for a desired number of adjacent interior sections.

19. The method according to claim 18, further comprising the steps of positioning a retaining means on the exterior of said construction to be inspected through which said guide insertion tube and probe are inserted into said first interior section.

20. A method for inspecting interior sections of a construction comprising the steps of
  inserting a fiberscope probe through a guide control body and a flexible guide insertion tube extending from said guide control body, at least said guide control body and said flexible guide insertion tube including means to articulate at least a distal end portion of said guide insertion tube,
  inserting said fiberscope probe and guide insertion tube into the interior of said construction, and
  manipulating at least one of said fiberscope probe and said guide insertion tube, including selectively articulating said guide insertion tube to aim said fiberscope probe from the exterior of said construction and axially displacing said fiberscope probe relative to said guide insertion tube, to direct said fiberscope probe in a desired direction within said construction.

21. The method according to claim 20, wherein said fiberscope probe is inserted into said guide insertion tube until an end portion thereof extends from said guide insertion tube.

* * * * *

UNITED STATES PATENT AND TRADEMARK OFFICE
CERTIFICATE OF CORRECTION

PATENT NO. : 4,696,544

DATED : September 29, 1987

INVENTOR(S) : James G. Costello

It is certified that error appears in the above-identified patent and that said Letters Patent is hereby corrected as shown below: Title page:

Change inventor's name from "James G. Costella" to --James G. Costello--.

ABSTRACT, line 12, change "in" to --is--.

ABSTRACT, line 13, after "next" insert --interior--.

Column 1, line 50, change "either or alone" to --either alone--.

Column 2, line 43, change "articulata-" to --articula---.

Column 2, line 44, change "direction" to --directions--.

Column 2, line 67, change "articulatable" to --articulable--.

Column 3, line 30, change "a" at end of line to --an--.

Column 3, line 57, change "articulatable" to --articulable--.

Column 4, line 48, omit the word "of".

UNITED STATES PATENT AND TRADEMARK OFFICE
CERTIFICATE OF CORRECTION

PATENT NO. : 4,696,544

DATED : September 29, 1987

INVENTOR(S) : James G. Costello

It is certified that error appears in the above-identified patent and that said Letters Patent is hereby corrected as shown below:

Column 5, line 13, change "articulatable" to --articulable--.

Column 5, line 14, change "direction to --directions--.

Column 5, line 21, change "ticulatable" to --ticulable--.

Column 5, line 53, change "and" to --end--.

Column 5, line 59, change "ticulatable" to --ticulable--.

Column 6, line 53 and 58, change "articulatable" to --articulable--.

Column 7, line 5, change "articulatable" to --articulable--.

Column 7, line 32, change "articulatable" to --articulable--.

UNITED STATES PATENT AND TRADEMARK OFFICE
CERTIFICATE OF CORRECTION

PATENT NO. : 4,696,544
DATED : September 29, 1987
INVENTOR(S) : James G. Costello It is certified that error appears in the above-identified patent and that said Letters Patent is hereby corrected as shown below:

Column 9, line 19, change "accomodating" to --accommodating--.

Signed and Sealed this

Twenty-third Day of February, 1988

Attest:

DONALD J. QUIGG

*Attesting Officer*     *Commissioner of Patents and Trademarks*